(12) United States Patent
Pears et al.

(10) Patent No.: US 6,727,296 B1
(45) Date of Patent: Apr. 27, 2004

(54) INK-JET INK COMPOSITIONS

(75) Inventors: David Alan Pears, Manchester (GB);
John Christopher Padget, Frodsham (GB); Mark Robert James, Manchester (GB); Peter Gregory, Manchester (GB); Philip John Double, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 09/868,601

(22) PCT Filed: Dec. 13, 1999

(86) PCT No.: PCT/GB99/04209

§ 371 (c)(1),
(2), (4) Date: Nov. 19, 2001

(87) PCT Pub. No.: WO00/37575

PCT Pub. Date: Jun. 29, 2000

(30) Foreign Application Priority Data

Dec. 21, 1998 (GB) ................................................ 9827894

(51) Int. Cl.[7] ......................... C09D 11/10; C08L 33/14; C08L 33/02
(52) U.S. Cl. ..................... 523/160; 523/161; 524/558
(58) Field of Search ............................... 523/160, 161; 524/556, 558; 106/31.27, 31.6

(56) References Cited

U.S. PATENT DOCUMENTS

| 4,141,890 A |   | 2/1979 | Hegar et al. |
| 4,375,357 A |   | 3/1983 | Wingard, Jr. et al. |
| 4,381,185 A | * | 4/1983 | Swanson et al. ............... 8/506 |
| 4,812,141 A | * | 3/1989 | Baumgartner et al. ......... 8/506 |
| 5,230,733 A | * | 7/1993 | Pawlowski .................... 525/61 |
| 5,231,135 A | * | 7/1993 | Machell et al. .............. 525/123 |
| 5,264,507 A | * | 11/1993 | Wiesenfeldt et al. ........ 526/256 |
| 5,637,637 A |   | 6/1997 | Sharma et al. |
| 5,786,410 A | * | 7/1998 | Foucher et al. .............. 523/161 |
| 5,952,429 A | * | 9/1999 | Ikeda et al. ............... 525/326.1 |
| 6,031,019 A | * | 2/2000 | Tsutsumi et al. ............ 523/160 |
| 6,221,932 B1 | * | 4/2001 | Moffatt et al. ............... 523/160 |
| 6,251,987 B1 | * | 6/2001 | Sacripante et al. ......... 524/555 |
| 6,432,194 B2 | * | 8/2002 | Johnson et al. ............. 106/499 |

FOREIGN PATENT DOCUMENTS

| EP | 0 048 214 |   | 3/1982 |
| EP | 0 130 789 |   | 1/1985 |
| EP | 0 465 124 |   | 1/1992 |
| EP | 0 535 490 |   | 4/1993 |
| EP | 0 921 166 |   | 6/1999 |
| FR | 1.523.820 |   | 9/1968 |
| FR | 2.107.876 |   | 5/1972 |
| GB | 1377067 A | * | 11/1974 |

* cited by examiner

*Primary Examiner*—Callie Shosho
(74) *Attorney, Agent, or Firm*—Pillsbury Winthrop LLP

(57) ABSTRACT

A water-dissipatable polymer having colorant attached thereto through a covalent —O-link and an ink comprising the water-dissipatable polymer and a liquid medium.

18 Claims, No Drawings

INK-JET INK COMPOSITIONS

This application is the National Phase of International Application PCT/GB99/04209 filed Dec. 13, 1999 which designated the U.S. and that International Application was published under PCT Article 21(2) in English.

This invention relates to coloured water-dissipatable polymers, to inks containing the coloured water-dissipatable polymers and to their use in ink jet printing.

Ink jet printing methods involve a non-impact printing technique for printing an image onto a substrate using ink droplets ejected through a fine nozzle onto a substrate without bringing the nozzle into contact with the substrate.

There are many demanding performance requirements for colorants and inks used in ink jet printing. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle. The most popular ink jet printers are thermal and piezoelectric ink jet printers.

There is a need for inks which are suitable for both thermal and piezo ink jet printers, have high colour strength and produce images having a high light-fastness and water-fastness when printed on a substrate.

We have surprisingly found that the coloration of water-dissipatable polymers having hydroxy functional groups by reacting the hydroxy functional groups with a colorant, a bridging group for a colorant or a colorant precursor and further reaction of the bridging compound with a colorant or colorant precursor and subsequent conversion of the colorant precursor to a colorant, gives a coloured water-dissipatable polymer which is suitable for use in inks for thermal and piezo ink jet printers.

According to a first aspect of the present invention there is provided a water-dissipatable polymer having colorant attached thereto through a covalent —O-link.

A —O-link may be exemplified by but is not limited to the following links such as an ether link ($R^1$—O—$R^2$, an ester link ($R^1$—O—C(O)—$R^2$) and a phosphate ester link ($R^1$—O—P(O)(OH)—$R^2$), where $R^1$ represents the water-dissipatable polymer and $R^2$ represents the colorant.

A water-dissipatable polymer of the invention is obtainable by attaching a colorant to a water-dissipatable polymer having hydroxy functional groups by means of a reaction between the hydroxy functional groups on the polymer with a colorant having a functional group capable of reacting with the hydroxy functional group.

The colorant may also be attached to the water-dissipatable polymer by means of a reaction between a hydroxy group on the polymer with a colorant precursor thereby forming a covalent bond therebetween and subsequently converting the colorant precursor to a colorant.

Alternatively, colorants may be grafted to the water-dissipatable polymer via a bridging compound. For example, colorant may be attached to the water-dissipatable polymer by means of a reaction between the hydroxy functional group on the water-dissipatable polymer with a bridging compound thereby forming a covalent bond therebetween and subsequently reading the bridging compound with a colorant or colorant precursor. The bridging agent may be a di-, tri-, tetra- or polyfunctional structure, and examples include, but are not limited to bis alkyl halides, tris dialkyl halides, bis acid chlorides, tris dia chlorides, bis vinyl sulphones, tris divinyl sulphones, mixtures of alkyl halides and acid chlorides, michael acceptors, cyanuric chloride and related reactive 1,3,5-triazines, other reactive heterocyclic halides and aromatic halides. Most preferably cyanuric chloride is used.

The water-dissipatable polymer of the invention is preferably prepared by condensing a water-dissipatable polymer having hydroxy functional groups with a colorant having a functional group reactive towards the hydroxy functional groups. Such functional groups are described above. Up to 100%, preferably at least 95%, more preferably at least 90%, most preferably at least 85% of the hydroxy functional groups are reacted with the colorant. The condensation is performed by preparing a solution or suspension of a water-dissipatable polymer having hydroxy functional groups in an aqueous and/or non-aqueous solvent. Preferably the condensation is performed at a pH of 5 to 14, more preferably of 6 to 13, especially of 7 to 12. The condensation is preferably performed in the presence of an inorganic or organic base. Preferred inorganic bases are NaOH, KOH, $Na_2CO_3$, $K_2CO_3$. Preferred organic bases are trialkyl amines, 1,5-diazabicyclo[4.3.0]non-5-ene (DBN), 1,8-diazabicyclo[5.4.0]undec-7-ene (DBU), and 1,4-diazabicyclo[2.2.2]octane (DABCO). Subsequently an aqueous solution of a colorant is added to the suspension and the mixture is stirred until the reaction is complete.

Alternatively a non-aqueous grafting reaction can be used to react the water-dissipatable polymer having hydroxy functional groups with a colorant. The colorant and polymer are stirred in a non-aqueous solvent with a base (either homogeneous or heterogeneous) and heated as required to complete the reaction. In the case of ester formation, for example reacting an acid functionalised colorant (e.g. phosphoric acid functionalised) and the water-dissipatable polymer having hydroxy functional groups, conditions are required to remove the generated water either physically (e.g. by azeotroping, molecular sieves) or chemically using a dehydrating agent such as dicyclohexylcarbodiimide or dicyandiamide. Acid catalysts such as p-toluenesulphonic acid or sulphuric acid may also be employed.

The water-dissipatable polymer of the invention may be isolated from the aqueous system by either acidification and filtration; dilution with a water miscible solvent and filtration, salting out with organic salts or solutions of organic salts or combinations of these methods. Suitable salts include sodium chloride, ammonium chloride, sodium sulphate and lithium chloride. Alternatively the mixture is acidified until the water-dissipatable polymer of the invention precipitates out or the solvent is evaporated or the solvent is diluted with water until the water-dissipatable polymer of the invention precipitates out.

Alternatively the water-dissipatable polymer of the present invention may be purified by ion-exchange methods on cationic resins. Other options include the removal of low molecular weight materials such as co-solvents used for the polymerisation, low molecular weight salts, impurities and free monomers by ultra-filtration, osmosis, reverse osmosis, dialysis, ultra-filtration or a combination thereof, followed by evaporation of the water.

Preferably the number average molecular weight (Mn) of the water-dissipatable polymer used to make the polymer of the invention is less than 25,000, more preferably is less than 20,000, especially less than 15,000. The Mn of the polymer may be measured by gel permeation chromatography ("gpc").

The gpc method used for determining Mn preferably comprises applying the polymer to a chromatography column parked with cross-linked polystyrene/divinyl benzene, eluting the column with tetrahydrofuran at a temperature of 40° C. and assessing the Mn of the polymer compared to a number of a polystyrene standards of a known Mn. Suitable cross-linked polystyrene/divinyl benzene chromatography columns are commercially available from Polymer Laboratories.

As an alternative to the gpc method for determining Mn, the Mn may be determined using for example by multi-angle light scattering (MALLS).

The water-dissipatable polymer may be a copolymer, for example a random, alternating or block copolymer, preferably a random copolymer.

The water-dissipatable polymer may be a polyurethane, polyester or an olefinic polymer. Preferably the water-dissipatable polymer is an olefinic polymer. An olefinic polymer is a polymer obtainable from the polymerisation of one or more olefinically unsaturated monomers.

The water-dissipatable olefinic polymer is preferably obtainable from the polymerisaton of one or more olefinically unsaturated monomers having hydroxy functional groups, and one or more olefinically unsaturated monomers having water-dispersing groups optionally in the presence of one or more olefinically unsaturated monomers which are free from water-dispersing groups.

Preferred olefinically unsaturated monomers having hydroxy functional group(s) include, but are not limited to, hydroxy-functional esters of acrylic acid, methacrylic acid, maleic acid, or fumaric acid. Examples of such monomers include hydroxy functional alkyl (preferably 1 to 18 C) (meth)acrylates such as 2-hydroxy ethylacrylate, 2-hydroxy ethylmethacrylate, 2-hydroxy propylacrylate, 3-hydroxy propylacrylate, 2-hydroxy propylmethacrylate, 3-hydroxy propylmethacrylate, 4-hydroxy butylacrylate, 4-hydroxy butylmethacrylate, hydroxy stearylacrylate, hydroxy stearylmethacylate; dihydroxy alkyl (preferably 1 to 6 C) adducts of maleic acid, fumaric acid, and phthalic acid; polyethylene oxide or polypropylene oxide functionalised hydroxyl functional (meth)acrylate such as the commercially available material known as BISOMER PPM5S, BISOMER PPM6E (International Specialty Chemicals); Caprolactone acrylate monomers such as the commercial available material known as TONE M100 Monomer (Union Carbide). Other examples include (4-hydroxymethyl cyclohexyl)-methylacrylate (Mitsubishi Chemical); and Blemmer PE-90, Blemmer PE-200, and Blemmer PE-350 (polyethylene glycol methacylates of molecular weights 163–173, 261–303 and 387–468 respectively); Blemmer 70 PEP-350B $(CH_2=C(CH_3-C(=O)-(EO), (PO)^3)-H$ where EO is polyethylene oxide, PO is polypropylene oxide and the molecular weight is about 450); and Blemmer-GLM (glycerol dimethacrylate) (all Nippon Oil and Fats Co.); N-methylol acrylamide, glycerol monomethacrylate and trimethylol propane mono methacylate.

Olefinically unsaturated monomers having a hydroxy functional group also includes olefinically unsaturated monomers having a group which is convertible to a hydroxy functional group and include but are not limited to vinyl acetate, vinyl benzoate, vinyl benzyl chloride, vinyl bromide and vinyl chloride.

Water-dispersing groups provide the facility of self-dispersibility and solubility to the polymer in ink media, especially in water. The water-dispersing groups may be ionic, non-ionic or a mixture of ionic and non-ionic water-dispersing groups. Preferred ionic water-dispersing groups include basic amine groups, cationic quaternary ammonium groups and acid groups, for example phosphoric acid groups, sulphonic acid groups and carboxylic acid groups.

The water-dispersing groups may be incorporated into the polymer in the form of monomers or oligomers bearing the appropriate water-dispersing groups. One may also react a polymer which is not water-dissipatable with monomers or oligomers which make the polymer water-dissipatable.

The nature and level of water-dispersing groups in the polymer influences whether a solution, dispersion, emulsion or suspension is formed on dissipation of the water-dissipatable polymer.

The water-dispersing group content of the water-dissipatable polymer may vary within wide limits but is preferably sufficient to make the water-dissipatable polymer form stable ink-jet printing inks in water and aqueous media.

The acid water-dispersing groups may be subsequently fully or partially neutralised with a base containing a cationic charge to give a salt. If the acid water-dispersing groups are used in combination with a non-ionic water-dispersing group, neutralisation may not be required. The conversion of any free acid groups into the corresponding salt may be effected during the preparation of the water-dissipatable polymer and/or during the preparation of an ink from the water-dissipatable polymer.

Preferably the base used to neutralise any acid water-dispersing groups is ammonia, an amine or an inorganic base. Suitable amines are tertiary amines, for example triethylamine or triethanolamine. Suitable inorganic bases include alkaline hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives the required counter ion desired for the ink which is prepared from the polymer. For example, suitable counter ions include $Li^+$, $Na^+$, $K^+$, $NH_4^+$ and substituted ammonium salts.

Preferred olefinically unsaturated monomers providing ionic water-dispersing groups include acrylic acid, methacrylic acid, itaconic acid, maleic acid, monoalkyl itaconates (for example, monomethyl maleate, monoethyl maleate, monobutyl maleate and monooctyl maleate), citraconic acid, styrenesulfonic acid, vinylbenzylsulfonic acid, vinylsulfonic acid, acryloyloxyalkyl sulfonic acids (for example, acryloyloxymethyl sulfonic acid, acryloyloxyethyl sulfonic acid, acryloyloxypropyl sulfonic acid and acryloyloxybutyl sulfonic acid), methacryloyloxymethyl sulfonic acid, methacryloyloxyethyl sulfonic acid, methacryloyloxypropyl sulfonic acid and methacryloyloxybutyl sulfonic acid), 2-acrylamido-2-alkylalkane sulfonic acids (for example 2-acrylamido-2-nethylethanesulfonic acid, 2-acrylamido-2methylpropanesulfonic acid and 2-acrylamido-2-methylbutane sulfonic acid), 2-methacrylamido-2-alkylalkane sulfonic acids (for example, 2-methacrylamido-2-methylethanesulfonic acid, 2-methacrylamido-2-methylpropanesulfonic acid and 2-methacrylamido-2-methylbutanesulfonic acid), mono-(acryloyloxyakyl) phosphates (for example, mono(acryloyloxyethyl)phosphate and mono(3-acryloyloxypropyl)phosphates) and mono (methacryloyloxyalkyl)phosphates (for example, mono (methacryloyloxyethyl)phosphate and mono(3-methacryloyloxypropylphosphate).

Non-ionic water-dispersing groups may be in-chain, pendant or terminal groups. Preferably non-ionic water-dispersing groups are pendant polyoxyalkylene groups, more preferably polyoxyethylene groups. The non-ionic water-dispersing groups may be introduced into the water-dissipatable polymer in the form of a compound bearing non-ionic water-dispersing groups and at least one (although preferably only one) copolymerisable olefinically unsaturated group.

Preferred olefinically unsaturated monomers providing non-ionic water-dispersing groups include alkoxy polyethylene glycol (meth)acrylates, preferably having a number average molecular weight of from 350 to 2000. Examples of such monomers which are commercially available include ω-methoxypolyethylene glycol (meth)acrylate and diethylene glycol mono vinyl ether.

In addition to the water-dissipatable polymer comprising olefinically unsaturated monomers having a hydroxy functional group or a group which is convertible to a hydroxy functional group, and one or more olefinically unsaturated monomers having water-dispersing groups, the water-dissipatable polymer may also contain one or more olefinically unsaturated monomers which are free from water-dispersing groups and/or hydroxy functional groups.

Preferred olefinically unsaturated monomers which are free from water-dispersing groups include alkyl(meth)acrylates, optionally substituted styrenes, methacrylamides, allyl compounds, dienes, vinyl ethers, vinyl ketones, vinyl halides, vinylidene halides, olefins and unsaturated nitriles.

Preferred alkyl(meth)acrylates contain less than twenty carbon atoms. Examples include methyl acrylate, ethyl acrylate, n-propyl acrylate, isopropyl acrylate, n-butyl acrylate, isobutyl, sec-butyl acrylate, amyl acrylate, hexyl acrylate, 2-ethylhexyl acrylate, octyl acrylate, tert-octyl acrylate, 2-phenoxyethyl acrylate, 2-chloroethyl acrylate, 2-bromoethyl acrytate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, acylate, cyclohexyl acylate, furfuryl acrylate, tetrahydrofurfuryl acrylate, phenyl acrylate, 5-hydroxypentyl acrylate, 2,2-dimethyl-3-hydoxypropyl acrylate, 2-methoxyethyl acrylate, 3-methoxybutyl acrylate, 2-ethoxyethyl acrylate, 2-isopropoxyethyl acrylate, 2-butyoxyethyl acrylate, 2-(2-methoxyethoxy)ethyl acrylate, 2-(2-butoxyethoxy)ethyl acrylate, 1-bromo-2-methoxyethyl acrylate, 1,1-dichloro-2-ethoxyethyl acrylate, methyl methacrylate, ethyl methacrylate, n-propyl methacrylate, isopropyl methacrylate, n-butyl methacrylate, isobutyl methacrylate, sec-butyl methacrylate, amyl methacrylate, hexyl methacrylate, cyclohexyl methacrylate benzylmethacrylate, chlorobenzyl methacrylate, octyl methacrylate, N-ethyl-N-phenylaminoethyl methacrylate, 2-(3phenylpropyloxy)ethyl methacrylate, dimethylaminophenoxyethyl methacrylate and furfuryl methacrylate. Aromatic examples include but are not limited to 4-alkyl phenylacrylate or methacrylate, phenyl methacrylate, phenyl acrylate, and β-napthyl methacrylate, Preferred optionally substituted styrenes include styrene, methylstyrene, dimethylstyrene, trimethylstyrene, ethylstyrene, diethylstyrene, isopropylstyrene, butylstyrene, hexylstyrene, cyclohexylstyrene, decylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyene, bromostyrene, dibromostyrene, iodostyrene, trifluorostyrene and 2-bromo-4-tri-fluoromethylstyrene.

Preferred methacrylamides contain less than 12 carbon atoms. Examples include methylmethacrylamide, tert-butylmethacrylamide, tert-octylmethacrylamide, benzylmethacrylamide, cyclohexylmethacrylamide, phenylmethacrylamide, dimethylmetharylamide, dipropylmethacrylamide, hydroxyethyl-N-methylmethacrylamide, N-methylphenylmethacrylamide, N-ethyl-N-phenylmethacrylamide and methacrylhydrazine.

Preferred allyl compounds include allyl acetate, allyl caproate, allyl caprylate, allyl laurate, allyl palmitate, allyl stearate, allyl benzoate, allyl acetoacetate, allyl lactate, allyloxyethanol, allyl butyl ether and allyl phenyl ether.

Preferred vinyl ethers contain less than 20 carbon atoms. Examples include methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether and dimethylaminoethyl vinyl ether.

Preferred vinyl ketones contain less than 12 carbon atoms. Examples include methyl vinyl ketone, phenyl vinyl ketone and methoxyethyl vinyl ketone.

Preferred vinyl halides include vinyl chloride, vinylidene chloride and chlorotrifluoro ethylene.

Preferred olefins include unsaturated hydrocarbons having less than 20 carbon atoms. Examples include dicyclopentadiene, ethylene, propylene, 1-butene, 1-pentene, 1-hexene, 4-methyl-1-pentene, 1-heptene, 1-octene, 1-decene, 5-methyl-1-nonene, 5,5-dimethyl-1-octene, 4-methyl-1-hexene, 4,4-dimethyl-1-pentene, 5-methyl-1-hexene, 4-methyl-1-heptene, 5-methyl-1-heptene, 4,4-dimethyl-1-hexene, 5,5,6-trimethyl-1-heptene, 1-dodecene and 1-octadecene.

Preferred unsaturated nitrites include arylonitrile and methacyrlonitrile.

The preferred olefinically unsaturated monomers which are free from water-dispersing groups are the alkyl (meth)acrylates containing less than 20 carbon atoms, especially those specifically listed above.

Preferably the water-dissipatable olefinic polymer is an acrylic polymer. An acrylic polymer is preferably a polymer formed from a monomer system comprising at least 40 weight % (more preferably at least 50 weight %) of one or more monomers of formula $$CH_2=CR^2COOR^3$$

where $R^2$ is H or methyl and $ZR^3$ is optionally substituted alkyl of 1 to 12 carbon atoms or cycloalkyl of 5 to 12 (more preferably 1 to 8 and 5 to 8 carbon atoms respectively), examples of which have been given herein.

The water-dissipatable olefinic polymer may be prepared in a conventional manner by polmerising the olefinically unsaturated monomers having water-dispersing groups and olefinically unsaturated monomers having a hydroxy functional group or a group which is convertible to a hydroxy functional group, either alone or in the presence of olefinically unsaturated monomers which are free from water-dispersing and hydroxy functional groups. Temperatures of from 20° C. and 180° C. are preferred. The polymerisation may be continued until reaction between the monomers is complete.

In one embodiment the olefinic water-dissipatable polymer may be prepared by polymerising an acrylic oligomer having water-dispersing groups and at least one olefinically unsaturated terminal group in the presence of one or more olefinically unsaturated monomers having a hydroxy functional group or a group which is convertible to a hydroxy functional group, and optionally one or more olefinically unsaturated monomers which are free from water-dispersing groups and/or one or more olefinically unsaturated monomers having water-dispersing groups.

Alternatively an acrylic oligomer with at least one olefinically unsaturated terminal group and which is free from water-dispersing groups may be polymerised in the presence of one or more olefinically unsaturated monomers having a hydroxy functional group or a group which is convertible to a hydroxy functional group and one or more olefinically unsaturated monomers having water-dispersing groups.

Preferred polymerisation methods include solution polymerisation, emulsion polymerisation, suspension polymerisation and solution/dispersion polymerisation and such general methods as are well known in the art. More preferably aqueous or non-aqueous solution polymerisation and emulsion polymerisation is used and most preferably solution polymerisation is used.

If desired, an initiator may be used to assist the water-dissipatable olefinic polymer formation. Suitable initiators are free-radical generators. Examples of catalysts include azobis compounds, peroxides, hydroperoxides, redox catalysts, etc., for example, potassium persulfate, ammonium persulfate, tert-butyl peroctoate, benzoyl peroxide, isopropyl percarbonate, 2,4-dichlorobenzoyl peroxide, methyl ethyl ketone peroxide, cumene hydroperoxide, dicumyl peroxide, azobisisobutyronitrile, azobis(2-amidinopropane)hydrochloride and the like.

Typically 0.05 to 5% by weight of initiator is used relative to the total weight of the monomers. Preferably the polymerisation is performed in the presence of an emulsifying agent.

The molecular weight of the olefinic water-dissipatable polymer may be controlled by the addition of chain transfer agents and/or through the adjustment of the ration of the concentration of monomers relative to the concentration of initiator during the course of the polymerisation. Typical chain transfer agents are thiols, halocarbons and cobalt macrocycles.

When the water-dissipatable polymer is a polyester or polyurethane it may be prepared by conventional techniques, for example as described in WO99/50364 (polyurethanes) or WO98/59007 (polyesters) using a monomer carrying a protected hydroxy functional group to form the water-dissipatable polymer followed by removal of the protecting group prior to reaction with a colorant, a colorant precursor, or a bridging compound to give a covalent —O-link.

When the water-dissipatable polymer is prepared by the polymerisation of (a) monomers having hydroxy functional groups or a group which is convertible to a hydroxy functional group, and (b) monomers providing water-dispersing groups optionally in the presence of (c) monomers which are free from water-dispersing groups and hydroxy functional groups, it is preferred that the amount of (a) is from 1 to 95%, more preferably from 2 to 90% and the amount of (b) is from 1 to 95%, more preferably from 5 to 90% and the amount of (c) is from 0 to 95%, more preferably from 5 to 90% by weight, wherein (a)+(b)+(c) add up to 100.

The water-dissipatable polymer preferably has an acid value of from 0 to 750 mgKOH/g, more preferably 50 to 450 mgKOH/g, especially 50 to 225 mgKOH/g.

Suitable colorants include reactive dyes. Reactive dyes are known in the art as dyes as having functional groups reactive towards hydroxy functional groups. These reactive dyes include, but are not limited to: i) chlorine or fluorine containing reactive dyes, for example dichloro and monochloro triazine reactive dyes, ii) vinyl sulphone or protected vinyl sulphone reactive dyes for example sulphato ethyl sulphone reactive dyes, iii) aziridine functionalised dyes, iv) epoxide functionalised dyes, v) isocyanate functionalised dyes and vi) phosphoric acid functionalised dyes which give ester links on dehydration.

The colorant preferably has at least one functional group capable of reacting with a hydroxy functional group on the water-dissipatable polymer. If two or more such functional groups are present in the colorant, one preferably has a higher reactivity than the other(s) to prevent undesirable cross-linking which results in a non-desirable viscosity increase, making the water-dissipatable polymer less suitable for thermal ink-jet printing inks. Examples of suitable functional groups include alkyl halides, acid chlorides or bromides, reactive aryl and heterocyclic halides, esters, acids (if a catalyst and/or a dehydrating agent is used), reactive olefins and masked reactive olefins (for example vinyl sulphones or acrylates), isocyanates, isothiocyanates, epoxides, aziridenes, tosylates, mesylates and other sulphone leaving groups. The functional group may be present in the colorant or grafted to the colorant via a bridging compound.

The colorant preferably has a chromophoric group comprising an azo, anthraquinone, pyrroline, phthalocyanine, polymethine, aryl-carbonium, triphenodioxazine, benzodifuranone or indolene group. Preferred chromophoric groups are azo groups, especially monoazo, disazo, tisazo and phthalocyanine groups.

The colorant may be a single coloured component or a mixture of coloured components, for example it may be a mixture of different dyes. By using a mixture of different dyes as the colorant one may achieve greater flexibility in colour of the ink. The colorant may also comprise a colorant precursor. For example the colorant precursor may be converted to a colorant by a process comprising a diazotisation reaction. A diazotisation reaction suitably comprises the steps:

(i) diazotising an amino group in the colorant precursor using a diazotising agent; and (ii) coupling the product of step (i) with a coupling component forming an azo group therebetween.

Preferably the colorant is soluble in organic solvents and/or water, especially water. More preferably the dyes are water soluble anionic or catonic dyes. Most preferably an anionic dye is used to graft onto an anionic water-dissipatable polymer and a cationic dye is used to graft onto a cationic water-dissipatable polymer. Water solubility of the dye may be achieved by the presence of acidic or basic groups in the dye. Preferred acidic groups are phosphonic, carboxylic or sulphonic acids, and combinations and salts thereof.

In a second aspect of the present invention there is provided an ink comprising the components:

(a) a water-dissipatable polymer according to the first aspect of the present invention; and (b) a liquid medium.

Preferably the ink comprises from 0.5 to 50 parts of component (a) and from 50 to 99.5 parts of component (b), wherein all parts are by weight and the number of parts of (a)+(b)=100. The number of parts of component (a) is preferably from 0.5 to 28, more preferably from 2 to 25, and especially from 2.5 to 20 parts. Preferably component (b) comprises water and an organic solvent. More preferably component (b) comprises from 40 to 95 parts, more preferably from 50 to 90 parts of water; and from 2 to 60 parts, more preferably from 3 to 50 parts, especially from 5 to 35 parts of water-miscible organic solvent. Preferably component (a) is completely dissipated in component (b).

The number of parts of component (a) (the water-dissipatable polymer of the invention) is calculated on a 100% solids basis. For example 50 g of a water-dissipatable polymer of the invention in a 20% solids w/w dispersion is taken as 10 g of component (a).

The inks according to the second aspect of the invention may be prepared by mixing the water-dissipatable polymer of the invention with a liquid medium. Suitable techniques are well known in the art, for example agitation, ultrasonication or stirring of the mixture. The mixture of water-dissipatable polymer of the invention and liquid medium may be in the form of a dispersion, emulsification, suspension, solution or mixture thereof.

The liquid medium is preferably water, a mixture of water and an organic solvent and an organic solvent free from water. For example the water-dissipatable polymer of the invention may be added to water followed by the addition of one or more organic solvents. Preferably the water-dissipatable polymer of the invention is mixed with a liquid medium, comprising a mixture of water and one or more organic solvents.

When the liquid medium comprises a mixture of water and an organic solvent, the weight ratio of water to organic solvent is preferably from 99:1 to 1:99, more preferably from 99:1 to 50:50, especially from 95:5 to 80:20 and most preferably 90:10.

It is preferred that the organic solvent present in the mixture of water and organic solvent is a water-miscible organic solvent or a mixture of such solvents.

Suitable water-miscible organic solvents include $C_{1-5}$-alkanols, e.g. methanol, ethanol, n-propanol, isopropanol, n-butanol, sec-butanol, tert-butanol and isobutanol; amides, e.g. dimethytormamide and dimethylacetamide; ketones and ketone alcohols, e.g. acetone and diacetone alcohol; $C_{2-4}$-ether, e.g. tetrahydrofuran and dioxane; alkylene glycols or thioglycols containing a $C_2$–$C_6$ alkylene group, e.g. ethylene glycol, propylene glycol, butylene glycol, pentylene glycol and hexylene glycol; poly(alkyleneglycol)s and thioglycol)s, e.g. diethylene glycol, thiodiglycol, polyethylene glycol and polypropylene glycol; polyols, e.g. glycerol and 1,2,6-hexanetriol; and lower akyl glycol and polyglycol ethers, e.g. 2-methoxyethanol, 2-(2-methoxyethoxy)ethanol, 2-(2-ethoxyethoxy) ethanol, 2-(2-butoxyethoxy)ethanol, 3-butoxypropan-1-ol, 2[2-(2-methoxyethoxy)-ethoxy]ethanol, 2-[2-(2-ethoxyethoxy)ethoxy]-ethanol; cyclic esters and cyclic amides, e.g. optionally substituted pyrrolidones; sulpholane; and mixtures containing two or more of the aforementioned water-miscible organic solvents. Preferred water-miscible organic solvents are $C_{1-6}$-alkyl mono ethers of $C_{2-6}$-alkylene glycols and $C_{1-6}$-alkyl mono ethers of poly($C_{2-6}$-alkylene glycols).

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di(2-ethylhexyl) phthalate; alcohols having six or more carbon atoms, e.g. hexanol, octanol, benzyl alcohol, phenyl ethanol, phenoxy ethanol, phenoxy propanol and phenoxy butanol; ethers having at least 5 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof. Benzyl alcohol is especially preferred.

The ink optionally contains a biocide, for example Proxel GXL (Proxel is a trade mark of Avecia Limited) or Kathon (Kathon is a trade mark of Rohm and Haas), a fungicide, a rheological agent, e.g. a wax (e.g. beeswax), a clay (e.g. bentonite), an IR absorber, for example Projet 900NP (Projet is a trade mark of Avecia Limited), or a fluorescent brightener, for example C.I. Fluorescent Brightener 179 and/or UV absorber, for example hydroxy phenylbenzotriazole. Furthermore the ink optionally contains a surface active agent, wetting agent and/or an emulsifier, for example those described in McCutcheon's Emulsifiers and Detergents 1996 International Edition or in Surfactants Europa $3^{rd}$ Edition 1996 each of which is incorporated herein by reference. In a preferred embodiment the ink of the present invention does not contain any pigments.

The ink preferably has a pH from 3 to 11, more preferably from 4 to 10. The pH selected will depend to some extent on the desired cation for colorant and the material used to construct the ink jet printer head. The desired pH may be obtained by the addition of an acid, base or pH buffer. Where a base is used this is preferably the same base as was used to neutralise any anionic dispersing group during the preparation of the water-dissipatable polymer of the invention.

The viscosity of the ink is preferably less than 20 mPa.s (cP), more preferably less than 15 mPa.s (cP), especially less than 10 mPa.s(cP), at 20° C.

Preferably the ink has been filtered through a filter having a mean pore size below 10 μm, preferably below 5 μm, more preferably below 2 μm, especially below 0.45 μm. In this way particulate matter is removed which could otherwise block fine nozzles in an ink jet printer.

Preferably the ink contains less than 500 ppm, more preferably less than 250 ppm, especially less than 100 ppm of in total of divalent and trivalent metal ions.

The inks of the present invention have the advantage that they are suitable not only for the use in piezoelectric ink jet printer but also in thermal and continuous ink jet printers. Many other inks based on polymers work poorly or even not at all in thermal ink jet printers.

Inks of the present invention form discrete droplets on the substrate with little tendency for diffusing. Consequently sharp images with excellent print quality and little if any bleed between colours printed side by side can be obtained. Furthermore the inks show good storage stability, wet and light fastness and fastness to both acidic and alkaline highlighter pens.

A third aspect of the invention provides a process for printing an image on a substrate comprising applying thereto an ink according to the second aspect of the present invention by means of an ink jet printer.

The ink jet printer preferably applies the ink to the substrate in the form of droplets which are ejected through a small nozzle onto the substrate. Preferred ink jet printers are piezoelectric ink jet printers and thermal ink jet printers. In thermal ink jet printers, programmed pulses of heat are applied to the ink in a reservoir by means of a resistor adjacent to the nozzle, thereby causing the ink to be ejected in the form of small droplets directed towards the substrate during relative movement between the substrate and the nozzle. In piezoelectric ink jet printers the oscillation of a small crystal causes ejection of the ink from the nozzle.

The substrate is preferably a paper, plastic, or textile material, more preferably a paper, an overhead projector slide or a textile material, especially paper.

Preferred papers are plain, coated or treated papers which may have an acid, alkaline or neutral character. Most preferably the substrate is a coated paper.

According to a fourth feature of the invention there is provided an ink jet printer cartridge, optionally refillable, containing an ink as hereinbefore defined.

The invention will now be described by example only. All parts and percentages are by weight unless specified otherwise. In the examples, compounds referred to by reference to CI numbers are the dyestuffs identified by these numbers in the Colour Index International, 3$^{rd}$ Edition, 3$^{rd}$ Revision. Abbreviations used herein:

| | |
|---|---|
| MAA = | methyl acrylic acid |
| MAA = | methyl methacrylate |
| HEMA = | hydroxy ethyl methacrylate |
| EHA = | ethyl hexylacrylate |
| Sty = | styrene |
| EA = | ethyl acrylate |
| AIBN = | azo-iso-butylnitrile |
| β-CEA = | β-carboxylate ethyl acrylate |
| HPA = | hydroxy propylacrylate |
| AA = | acrylic acid |

Preparation of Water-dissipatable Polymer 1 Carrying Hydroxy Functional Groups MAA/MMA/HEMA/EHA/EA=15/34/10/10/31
using components as listed in Table 1 below and where Formula 1 represents a repeat unit of 2-hydroxyethylmethacrylate (HEMA) where n=10% w/w of the water-dissipatable polymer.

TABLE 1

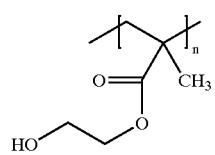

Formula 1

| Component Number | Component | Weight (g) |
|---|---|---|
| 1 | Azo-iso-Butylnitrile (AIBN) | 0.6 |
| 2 | Butyl-3-Mercaptopropionate | 7.0 |
| 3 | Methyl Ethyl ketone | 333.5 |
| 4 | Methyl Acrylic Acid (MAA) | 35.0 |
| 5 | Methyl Methacrylate (MMA) | 79.6 |
| 6 | Hydroxy Ethyl Methacrylate (HEMA) | 23.3 |
| 7 | Ethyl Hexyl Acrylate (EHA) | 23.3 |
| 8 | Ethyl Acrylate (EA) | 71.9 |
| 9 | Azo-iso-Butylnitrile (AIBN) | 1.7 |
| 10 | Methyl Ethyl ketone | 30.0 |

The initial charge (components 1,2,3,4,5,6,7 and 8) were added to a stirred reaction vessel under a nitrogen atmosphere and heated to 80° C. The initiator feed (components 9 and 10) was charged to a 50 ml syringe. At 80° C. the initiator feed was added slowly to the initial charge mixture via the use of a syringe pump such that the total addition time was three hours. When the addition of the initiator feed was completed, the reaction mixture was left to stir for one hour at 90° C. A monomer 'burn-up' was then carried out by adding V65 initiator 0.2% on solids (V65=2,2-azobis(2,4-dimethylvaleronitrile CAS 4419-11-8, V65 is a trade name of Wako) and leaving for a further 40 minutes at 90° C. The product was then cooled to room temperature before being bottled.

The solution of the Water-dissipatable Polymer 1 was found to have a solids content of 40.0%. Molecular weight distribution was done on the Water-dissipatable Polymer 1 by gel permeation chromatography giving Mw=10550 and Mn=4760. Purification of the Water-dissipatable Polymer 1 was carried out to remove any un-reacted monomer. 10 parts of the water-dissipatable polymer was dissolved in 100 parts of aqueous ammonia (pH 9), cascade filtered and reverse osmosis was carried out until a low conductivity (<100 μs) was achieved.

EXAMPLE 1

Preparation of Coloured Water-dissipatable Polymer 1

A suspension of the Water-Dissipatable Polymer 1 (9 parts) in water (50 parts) at room temperature was adjusted to pH 9.5 by addition of 2N sodium hydroxide solution. The mixture was stirred for 2 hours and then a solution of CI Reactive Red 11 (30 parts) in water (200 parts) was added dropwise over 10 minutes whilst maintaining pH 9.5 by dropwise addition of 2N sodium hydroxide. The solution was left to stir at pH 9.5 and room temperature for 60 hours and then adjusted to pH 1 by addition of excess 2N hydrochloric acid. The resulting solid was isolated by filtration and washed with copious distilled water. The solid was dissolved in aqueous ammonia, precipitated by acidification to pH 1 with 2N hydrochloric acid, isolated by filtration and washed with distilled water. The dissolving, isolation and precipitation process was then repeated twice.

The resultant coloured water-dissipatable polymer was dissolved in aqueous ammonia and the solution was filtered through a cascade of filters (Glass microfibre GF/A, GF/F and membrane) to 0.45 micron and then purified by reverse osmosis using a 3000 MW cut off membrane and evaporated to dryness at approximately 80° C. to give Coloured Water-dissipatable Polymer 1 containing a repeat unit of Formula 2:

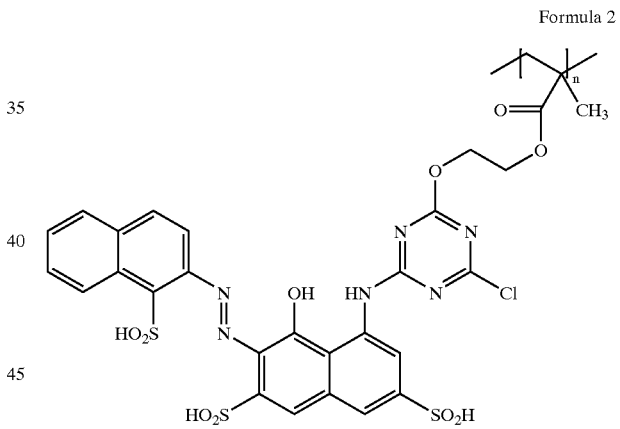

Formula 2

Preparation of Ink

Inks were prepared by dissolving 10% of the Coloured Water-dissipatable Polymer 1 in a stock solution of 9 parts water and 1 part 1-methyl-2-pyrrolidinone with the addition of concentrated ammonia to give a pH of 9–10. The inks were then filtered through a 0.45 micron membrane filter and printed using an HP 560 thermal IJ printer. The following results (Table 2) were obtained on Gilbert Bond paper:

TABLE 2

| Example 1 % solid in ink | OD Optical Density | a | b | Run down (5 min) |
|---|---|---|---|---|
| 10 | 0.362 | +33.01 | −16.92 | 10 |
| 10 | 0.720 | +54.63 | −19.47 | 9 |

The resultant prints had excellent fastness to acidic and alkaline highlighter pens.

Preparation of a Colorant of Formula 3 Comprising a Dye and a Bridging Compound

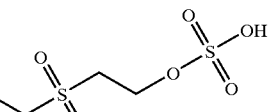
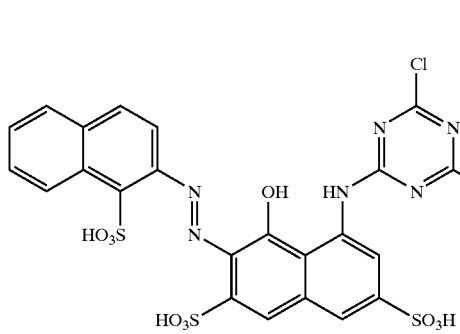

Formula 3 para-Aminobenzenesulfatoethylsulfone (8 parts) was added to a stirred solution of Cl Reactive Red 11 (20 parts) in water (80 parts) at room temperature and the resulting solution was adjusted to pH 7.0 by addition of 2N sodium hydroxide. The solution was allowed to stir at pH 7.0 and room temperature overnight and then salt was added until a solid precipitated. The resulting suspension was filtered and the collected coloured paste was washed with brine.

The coloured paste was dissolved in distilled water and the solution was filtered through a cascade of filters (Glass microfibre GF/A, GF/F and membrane) to 0.45 micron and then purified by reverse osmosis using a 500 MW cut off membrane and evaporated to dryness on a rotary evaporator at 40° C. to leave the colorant of Formula 3 (13 parts) stirred for 2 hours and the colorant of Formula 3, as prepared above (1 part) was added and the solution was readjusted to pH 12. The resulting solution was stirred at pH 12 and room temperature for 72 hours and then adjusted to pH 1 by addition of excess 2N hydrochloric acid. The resulting solid was isolated by filtration and washed with copious distilled water. The solid was dissolved in aqueous ammonia, precipitated by acidification with 2N hydrochloric acid, isolated by filtration and washed with distilled water. The dissolving, isolation and precipitation process was then repeated again.

The resultant coloured water-dissipatable polymer was dissolved in aqueous ammonia and the solution was filtered through a cascade of filters (Glass microfibre GF/A, GF/F and membrane) to 0.45 micron and then purified by reverse osmosis using a 3000 MW cut off membrane and evaporated to dryness at approximately 80° C. to give the Coloured Water-dissipatable Polymer 2 containing a repeat unit of Formula 4:

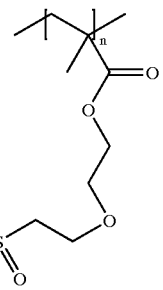
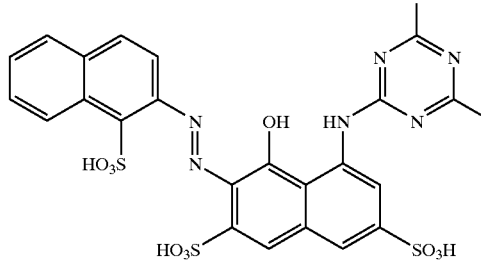

Formula 4

EXAMPLE 2
Preparation of Coloured Water-dissipatable Polymer 2

A suspension of the Water-dissipatable Polymer 1 in water (5 parts) at room temperature was adjusted to pH 12 by addition of 2N sodium hydroxide solution. The mixture was Preparation of Ink An ink was prepared by dissolving 10% of the Coloured Water-dissipatable Polymer 2 in a stock solution of 9 parts water and 1 part 1-methyl-2-pyrrolidinone with the addition of concentrated ammonia to give a pH of 9–10. The ink was then filtered through a 0.45 micron membrane filter and printed using an HP 560 thermal Ink-Jet printer. The following results (Table 3) were obtained on Gilbert Bond paper

TABLE 3

| Example 2 % Solid in Ink | OD | a | b | Run Down (5 min) |
|---|---|---|---|---|
| 10 | 0.738 | +31.07 | −17.66 | 10 |

The resultant print had excellent fastness to acidic and alkaline highlighter pens. The print lost 5% OD on fading for 100 hours in an accelerated light fastness test.

Preparation of a iso-Nonylamine Salt of a Colorant of Formula 5

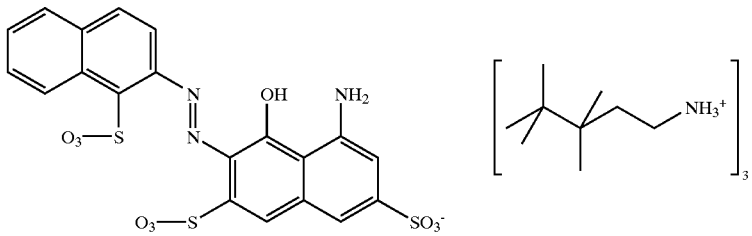

Formula 5 iso-Nonylamine (6 parts) was dissolved in distilled water (150 parts) and set stirring. A solution of a dye base of Cl Reactive Red 11 sodium salt (5 parts) in water (50 parts) was screened through a GF/F filter and added dropwise over 30 minutes to the solution of iso-nonylamine, maintaining pH 7.0 by addition of 2N hydrochloric acid. The mixture was stirred for 30 minutes and then the resulting suspension was filtered to give a paste. The collected paste was washed with water (20 parts) and then dried at room temperature and under reduced pressure over phosphorus pentaoxide for 24 hours to leave a red solid colorant of Formula 5.

EXAMPLE 3

Preparation of Coloured Water-dissipatable Polymer 3

Cyanuric chloride (1.3 parts) and potassium carbonate (1 part) were added to a stirred solution of Water-dissipatable Polymer 1 (10 parts) in tetrahydrofuran (110 parts) at room temperature. The resulting mixture was stirred for 2 hours and then a solution of the colorant of Formula 5 (130 parts), triethylamine (1.1 parts) and N,N-dimethylaminopyridine (0.2 parts) in dimethylformamide (260 parts) was added in one portion. The solution was left to stir for 60 hours and then pored onto vigorously stirred water (3000 parts). The resulting precipitate was collected by filtration and washed with copious distilled water. The solid was dissolved in aqueous ammonia, precipitated by acidification with 2N hydrochloric acid, isolated by filtration and washed with distilled water. The dissolving, isolation and precipitation process was then repeated again.

The resultant coloured water-dissipatable polymer was dissolved in aqueous ammonia and the solution was filtered through a cascade of filters (Glass microfibre GF/A, GF/F and membrane) to 0.45 micron and then purified by reverse osmosis using a 3000 MW cut off membrane and evaporated to dryness at approximately 80° C. to give a Coloured Water-dissipatable Polymer 3 containing a repeat unit of Formula 6:

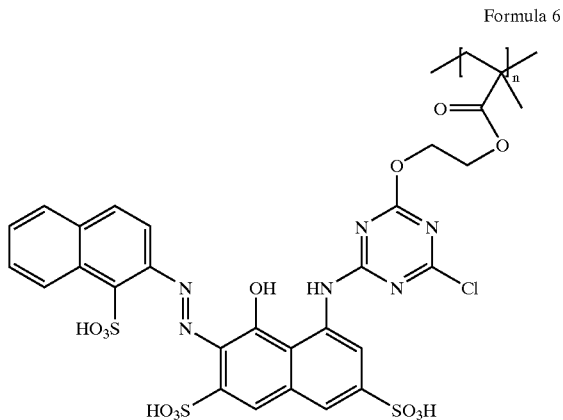

Formula 6

Preparation of Ink

An ink was prepared by dissolving 10% of the Coloured Water-dissipatable Polymer 3 in a stock solution of 9 parts water and 1 part 1-methyl-2-pyrrolidinone with the addition of concentrated ammonia to give a pH of 9–10. The ink was filtered through a 0.45 micron membrane filter and printed using an HP 560 thermal Ink-Jet printer. The following results (Table 4) were obtained on Gilbert Bond paper:

TABLE 4

| Example 3 % Solid in Ink | OD | a | b | Run Down (5 min) |
|---|---|---|---|---|
| 10 | 0.393 | +30.37 | −13.69 | 10 |

Preparation of a Phosponic Acid Colorant of Formula 7

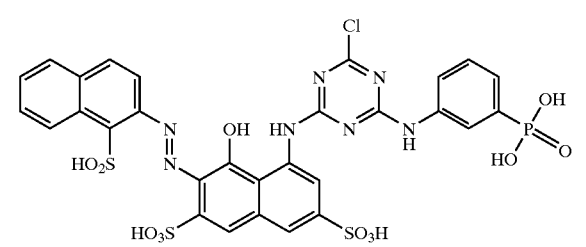

Formula 7

Meta-Aminophenylphosphonic acid (5 parts) was added to a stirred solution of Cl Reactive Red 11 (20 parts) in water (80 parts) at room temperature and the resulting solution was adjusted to pH 7.0 by addition of 2N sodium hydroxide. The solution was allowed to stir at pH 7.0 and room temperature overnight and then salt was added until a solid precipitated. The resulting suspension was filtered to give a coloured paste and to the paste was washed with brine.

The coloured paste was dissolved in distilled water and the resultant solution was filtered through a cascade of filters (Glass microfibre GF/A, GF/F and membrane) to 0.45 micron and then purified by reverse osmosis using a 500 MW cut off membrane and evaporated to dryness on a rotary evaporator at 40° C. to leave the colorant of Formula 7 (9 parts)

Preparation of a iso-Nonylamine salt (Formula 8) of the Phosphonic Acid Colorant of Formula 7

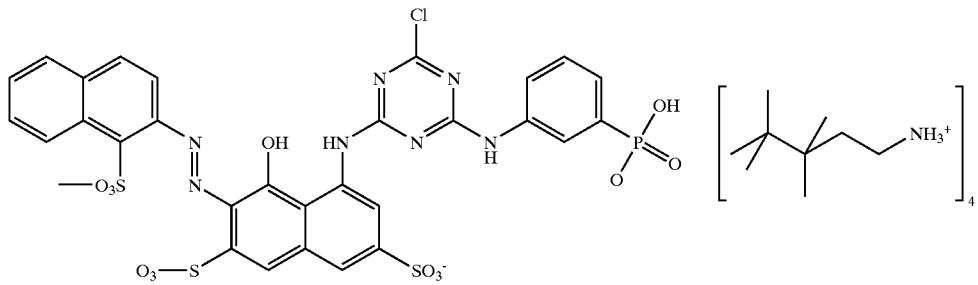

Formula 8 iso-Nonylamine (8 parts) was dissolved in distilled water (150 parts) and set stirring. A solution of the phosphonic acid colorant of Formula 7 as prepared above (9 parts) in water (70 parts) was screened through GF/F filter and added dropwise over 30 minutes to the solution of iso-nonylamine, maintaining pH 7.0 by addition of 2N hydrochloric acid. The mixture was stirred for 30 minutes and then the resulting suspension was filtered. The collected paste was washed with water (20 parts) and then dried at room temperature and under reduced pressure over phosphorus pentaoxide to leave a red solid (10 parts) colorant of Formula 8.

EXAMPLE 4

Preparation of a Coloured Water-dissipatable Polymer 4

The Water-dissipatable Polymer 1 (2 parts), dicyandiamide (1.3 parts) and the colorant of Formula 8 (3 parts) were added to dimethylformamide (30 parts) and set stirring. The solution was heated to 130° C. for 72 hours and then cooled to room temperature and poured onto water (300 parts). The resultant suspension was adjusted to pH 10 with aqueous ammonia and then the resulting solution was adjusted to pH 1 by addition of 2N hydrochloric acid. The supernatant liquid was decanted and the resulting tar-like material was dissolved in acetone (30 parts) and diluted with water (300 parts).

The resultant suspension was adjusted to pH 10 with aqueous ammonia and the solution was filtered through a cascade of filters (Glass microfibre GF/A, GF/F and membrane) to 0.45 micron and then purified by reverse osmosis using a 3000 MW cut off membrane and evaporated to dryness at approximately 80° C. to give a Coloured Water-dissipatable Polymer 4 containing a repeat unit of Formula 9:

Formula 9

Preparation of Ink

An ink was prepared by dissolving the 10% of the Coloured Water-dissipatable Polymer 4 in a stock solution of 9 parts water and 1 part 1-methyl-2-pyrrolidinone with the addition of concentrated ammonia to give a pH of 9–10. The ink was then filtered through a 0.45 micron membrane filter and printed using an HP 560 thermal Ink-Jet printer. The following results (Table 5) were obtained on Gilbert Bond paper:

TABLE 5

| Example 4 % Solid in Ink | OD | a | b | Run Down (5 min) |
|---|---|---|---|---|
| 10 | 0.865 | +53.95 | −15.91 | 9 |

Preparation of Colorant of Formula 12

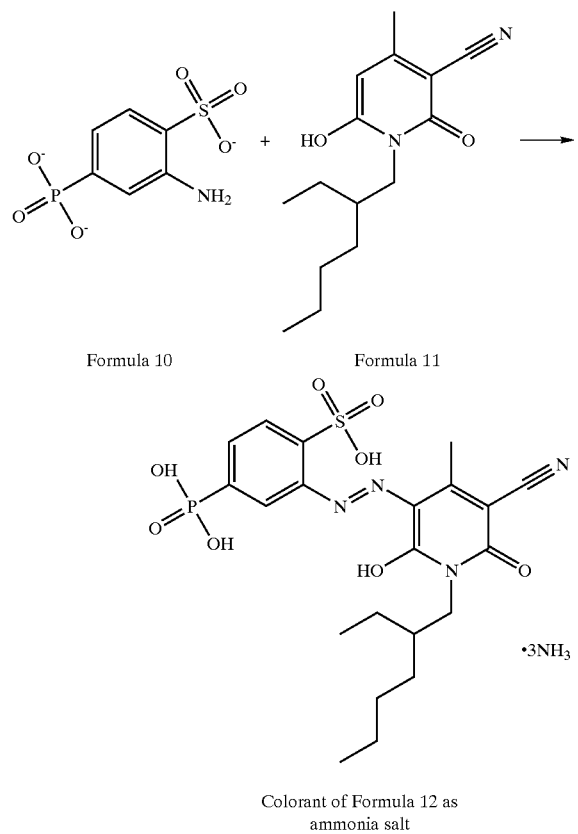

Formula 10    Formula 11

Colorant of Formula 12 as ammonia salt

The 2-amino-4-phosphonicacid benzene sulphonic acid (Formula 10) (40 parts) was stirred in water (600 parts) and the mixture was adjusted to pH 5.0 by addition of 48% sodium hydroxide solution. The resulting solution was cooled to 0–10° C. and 150 parts concentrated hydrochloric acid were added. To this mixture 75 parts of 2N Sodium nitrite were added and the mixture was allowed to stir for 10 minutes. Any excess nitrous acid was destroyed by the addition of sulphamic acid.

The pyridone (Formula 11) (42 parts) was dissolved in water (200 parts) at pH 8 by addition of 48% sodium hydroxide solution. This solution was added to the above mixture and adjusted to pH 5 by addition of sodium acetate. More pyridone (Formula 11) (10 parts) was added and the resulting mixture was allowed to warm to room temperature over night. The resulting mixture was filtered to leave a paste.

The paste was dissolved in water (600 parts) and adjusted to pH 9 by addition of ammonia and then added to concentrated hydrochloric acid (60 parts) and stirred for 15 minutes and then filtered to leave a paste. The paste was dissolved in water at pH 9 by addition of ammonia and the solution was dialysed to a Conductivity of <100 μs then filtered through a cascade of filters, (Glass microfibre, GF/A, GF/F and membrane) to 0.45 micron and dried in the oven at 60° C. to give 21 parts of a colorant of Formula 12 as a yellow solid.

Preparation of an iso-Nonylamine Salt of a Colorant of Formula 12 iso-Nonylamine (20 parts) was dissolved in distilled water (700 parts) and set stirring. A solution of the colorant of Formula 10 salt (16 parts) in water (300 parts) was screened through GF/F filter and added dropwise over 30 minutes to the solution of iso-nonylamine, maintaining pH 7.0 by addition of 2N hydrochloric acid. The mixture was stirred for 30 minutes and then the resulting suspension was filtered to give a paste. The collected paste was washed with water (200 parts) and then dried at room temperature and under reduced pressure over phosphorus pentaoxide for 24 hours to give the iso-nonylamine salt of colorant of Formula 12 as a yellow solid.

Example 5

Preparation of Coloured Water-dissipatable Polymer 5

The iso-nonylamine salt of colorant of Formula 12 prepared above (80 parts) and dicyanimide (20 parts) were added to a stirred solution of Water-dissipatable Polymer 1, (100 parts) in dimethylformamide (2000 parts) at room temperature. The resulting mixture was stirred for 7 hours at 100° C. then cooled to room temperature and stirred overnight.

Dicyanimide (20 parts) was added and the mixture was stirred at 100° C. for 7 hours. The resulting solution was poured into water (5000 parts) and the resulting precipitate was collected by filtration and washed with copious distilled water. The solid acid, was isolated by filtration and washed with distilled water. The dissolving, isolation and precipitation process was then repeated again.

The resultant coloured water-dissipatable polymer was dissolved in aqueous ammonia and the solution was filtered through a cascade of filters (Glass microfibre GF/A, GF/F and membrane) to 0.45 micron and then purified by reverse osmosis using a 3000 MW cut off membrane and evaporated to dryness at approximately 80° C. to give a Coloured Water-dissipatable Polymer 5 containing a repeat unit of Formula 13:

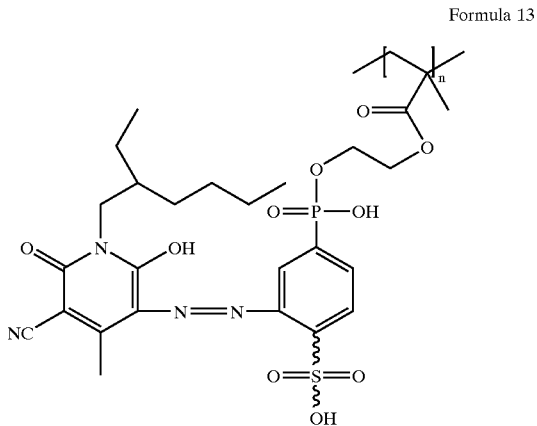

Formula 13

Preparation of Ink

An ink was prepared by dissolving the 10% of the Coloured Water-dissipatable Polymer 5 in a stock solution of 9 parts water and 1 part 1-methyl-2-pyrrolidinone with the addition of concentrated ammonia to give a pH of 9–10. The ink was filtered through a 0.45 micron membrance filter and printed using an HP 560 thermal Ink-Jet printer. The following results (Table 6) were obtained on Gilbert Bond paper:

TABLE 6

| Example 5 % Solid in Ink | OD | a | b | Run Down (5 min) |
|---|---|---|---|---|
| 10 | 0.504 | −15.19 | 55.90 | 10 |

EXAMPLES 6 TO 9

Example 1 may be repeated except that in place of Water-Dissipatable Polymer 1 there is used the following water-dissipatable polymer:
Example 6 MMA/Sty/MAA/HEMA 30/30/20/20
Example 7 MMA/Sty/AA/DEA 30/10/45/15
Example 8 MMA/MAA/βCEA/HPA 40/30/10/20
Example 9 MMA/Sty/MAA/HEMA/TONEM100 30/10/40/10/10

EXAMPLES 10 TO 25

Example 1 may be repeated except that in place of Cl Reactive Red 11 there is used Cl Reactive Blue 81, Cl Reactive Red 2, Cl Reactive Yellow 4, Cl Reactive Blue 89, Cl Reactive Brown 21, Cl Reactive Red 63, Cl Reactive Yellow 75, Cl Reactive Black 5, Cl Reactive Red 194, Cl Reactive Red 195, Cl Reactive Yellow 145, Cl Reactive Blue 173, Cl Reactive Orange 89, Cl Reactive Red 179, or Cl Reactive Yellow 133.

EXAMPLE 26

Further inks may be prepared having the formulations described in Tables 7 and 8 below wherein the following abbreviations are used. The number of parts by weight of each component is given. Water is included in each formulation to make the total number of parts up to 100. These inks may be applied to plain paper using an Ink-Jet printer.

| | |
|---|---|
| FRU | fructose |
| CAP' 1 to 9 | Identifies which of the coloured water-dissipatable polymers as prepared in Examples 1 to 9 may be used. The number of parts by weight of CAP is shown in the second column |
| BZ | Benzyl alcohol |
| DEG | Diethylene glycol |
| DMB | Diethyleneglycol monobutyl ether |
| ACE | Acetone |
| IPA | Isopropyl alcohol |
| MEOH | Methanol |
| 2P | 2-Pyrollidone |
| MIBK | Methylisobutyl ketone |
| SUR | Surfinol 465 (a surfactant) |
| PHO | $K_2PO_4$ |
| TEN | triethanolamine |
| NMP | N-methylpyrollidone |
| TDG | Thiodiglycol |
| CAP | Caprolactam |
| BUT | Butylcellosolve |
| GLY | Glycerol |

TABLE 7

| CAP* | CAP (parts by weight) | BZ | DEG | ACE | NaOH | $(NH_4)_2SO_4$ | IPA | MEOH | 2P | MIBK | BUT |
|---|---|---|---|---|---|---|---|---|---|---|---|
| 1 | 6 | 4 | 6 | | | | | | 10 | 10 | |
| 2 | 3 | 5 | 5 | | 0.2 | | | | 15 | | |
| 3 | 10 | 8 | | | | | | | 20 | 1 | 3 |
| 4 | 4 | 8 | | | 0.5 | 0.5 | | | 8 | 4 | 1 |
| 1 + 2 | (4 + 4) | 15 | 3 | 3 | | | 6 | | 5 | 4 | |
| 6 | 5 | 20 | | | | | 8 | | | | |
| 2 | 3 | 4 | | 5 | | | | 6 | 20 | 5 | 1 |
| 5 | 4 | 5 | 2 | 10 | | 0.3 | | | | | |
| 4 | 10 | 6 | 6 | 6 | | | 5 | 4 | 6 | 5 | |
| 4 | 5 | 6 | 2 | 2 | | | 1 | | 4 | | |
| 2 | 2 | 5 | | | | | | | 10 | | 4 |
| 5 | 4 | 5 | | 5 | | 0.1 | | 2 | | 6 | 3 |
| 7 | 2.0 | 15 | | 10 | 0.3 | | 3 | | 10 | | |
| 8 | 6 | 20 | 2 | 1 | | | | | 15 | 3 | |
| 9 | 1.0 | 5 | 4 | | | | | | 20 | 6 | |

TABLE 8

| CAP* | CAP (parts by weight) | BZ | NMP | SUR | TEN | TDG | FRU | PHO | DMB | $CH_2NH_2$ | CAP |
|---|---|---|---|---|---|---|---|---|---|---|---|
| 4 | 2 | 5 | | 0.15 | 0.4 | 20 | | | | | |
| 6 | 3 | 6 | 15 | | | | | 0.05 | | | 4 |
| 5 | 10 | 10 | | 0.3 | | 15 | | | 0.2 | | |
| 3 | 1 | 10 | 20 | | | | 0.5 | 0.2 | | | 2 |
| 2 | 8 | 15 | 15 | | 1 | 5 | | | | | |
| 1 | 5 | 10 | 10 | 0.2 | | | 1 | | 4 | 0.2 | |
| 7 | 3 | 5 | 3 | | | | 2 | | 6 | | |
| 4 | 10 | 9 | 7 | | 0.5 | | | 1 | 5 | | |
| 8 | 5 | 11 | | | | 12 | | | 8 | | 1 |
| 3 | 6 | 5 | 17 | | | | | | 7 | | |
| 5 | 5 | 8 | 5 | 0.1 | 0.2 | 2 | 0.5 | 0.1 | 5 | | |
| 2 | 2 | 10 | 5 | | | 10 | | | 5 | | |
| 4 | 8 | 5 | 8 | | | | | | 9 | | 2 |

TABLE 8-continued

| CAP* | CAP (parts by weight) | BZ | NMP | SUR | TEN | TDG | FRU | PHO | DMB | CH$_2$NH$_2$ | CAP |
|---|---|---|---|---|---|---|---|---|---|---|---|
| 9 | 10 | 4 | | | | | | | 12 | | |
| 1 | 10 | 10 | 1 | | 1 | 1 | | | | 1 | 1 |

What is claimed is:

1. An ink having a viscosity less than 20 mPa.s (cP) at 20° C., comprising the components:

(a) a water-dissipatable polymer with pendant hydroxy functional groups, wherein the water-dissipatable polymer has "number average molecular weight" less than 25,000 and is prepared by copolymerizing:

i) 1 to 95% of monomers having hydroxy functional groups, or a group which is convertible to a hydroxy functional group;

ii) 1 to 95% of monomers providing water-dispersing groups;

iii) 0 to 95% of monomers which are free from water-dispersing groups and hydroxy functional groups wherein i)+ii)+iii) add up to 100;

said water-dissipatable polymer having colorant attached thereto by means of said pendant hydroxy functional group through a covalent —O-link; and (b) a liquid medium.

2. An ink according to claim 1 wherein the water-dissipatable polymer is obtained by the reaction of a water-dissipatable polymer with pendant hydroxy functional groups with a colorant having a functional group capable of reacting with said pendant hydroxy functional groups.

3. An ink according to claim 1 wherein the water-dissipatable polymer is an olefinic polymer.

4. An ink according to claim 3 wherein the olefinic polymer is obtained from the polymerisation of 1 to 95% of olefinically unsaturated monomers having water-dispersing groups, 1 to 95% of olefinically unsaturated monomers having hydroxy functional groups or a group which is convertible to a hydroxy functional group; and 0 to 95% of olefinically unsaturated monomers which are free from water-dispersing and hydroxy functional groups, wherein the amounts of said olefinically unsaturated monomers add up to 100.

5. An ink according to claim 1 wherein component (a) is completely dissipated in component (b).

6. An ink according to claim 1 which comprises from 0.5 to 50 parts of component (a) and from 50 to 99.5 parts of component (b), wherein all parts are by weight and the number of parts of (a)+(b)=100.

7. An ink according to claim 1 wherein component (b) comprises water and an organic solvent.

8. An ink according to claim 7 where component (b) comprises from 40 to 95 parts of water and from 2 to 60 parts of water-miscible organic solvent.

9. An ink according to claim 1 for use in an ink jet printer.

10. A process for forming an image on a substrate comprising applying thereto an ink using an ink jet printer, wherein the ink is as defined in claim 1.

11. A paper or an overhead projector slide printed with an ink as defined in claim 1.

12. An ink jet printer cartridge, optionally refillable, containing an ink as defined in claim 1.

13. An ink according to claim 1, wherein at least 85% of the pendant hydroxy functional groups are covalently linked through —O— with the colorant.

14. An ink according to claim 1, wherein the water-dissipatable polymer is prepared by copolymerizing:

i) 2 to 90% of monomers having hydroxy functional groups or group which is convertible to hydroxy functional group;

ii) 5 to 90% of monomers providing water-dispersing groups; and iii) 5 to 90% by weight of monomers which are free from water-dispersing groups and hydroxy functional groups;

wherein i)+ii)+iii) add up to 100.

15. An ink having a viscosity less than 20 mPa.s (cP) at 20° C., comprising the components:

(a) a water-dissipatable polymer with pendant hydroxy functional groups, wherein the water-dissipatable polymer has "number average molecular weight" less than 25,000 and is prepared by copolymerizing:

i) 1 to 95% of monomers having hydroxy functional groups, or a group which is convertible to a hydroxy functional group;

ii) 1 to 95% of monomers providing water-dispersing groups;

iii) 0 to 95% of monomers which are free from water-dispersing groups and hydroxy functional groups wherein i)+ii)+iii) add up to 100;

said water-dissipatable polymer having colorant attached thereto by means of said pendant hydroxy functional group through a covalent —O-link; and (b) a liquid medium; wherein the colorant is attached to the water-dissipatable polymer by means of a reaction between a pendant hydroxy group on the polymer with a colorant precursor thereby forming a covalent bond therebetween and subsequently converting the colorant precursor to a colorant.

16. An ink having a viscosity less than 20 mPa.s (cP) at 20° C. comprising the components:

(a) a water-dissipatable polymer with pendant hydroxy functional groups, wherein the water-dissipatable polymer has "number average molecular weight" less than 25,000 and is prepared by copolymerizing:

i) 1 to 95% of monomers having hydroxy functional groups, or a group which is convertible to a hydroxy functional group;

ii) 1 to 95% of monomers providing water-dispersing groups;

iii) 0 to 95% of monomers which are free from water-dispersing groups and hydroxy functional groups wherein i)+ii)+iii) add up to 100;

said water-dissipatable polymer having colorant attached thereto by means of said pendant hydroxy functional group through a covalent —O-link; and (b) a liquid medium; wherein the colorant is attached to the water-dissipatable polymer by means of a reaction between a pendant hydroxy group on the polymer with a bridging compound thereby forming a covalent bond therebetween and subsequently reacting the bridging compound with a colorant or colorant precursor.

17. An ink according to claim 16 wherein the colorant precursor is converted to a colorant by a diazotisation reaction.

18. An ink according to claim 17 wherein the diazotisation reaction comprises:

(i) diazotising an amino group in the colorant precursor using a diazotising agent; and (ii) coupling the product of step (i) with a coupling component forming an azo group there between.

* * * * *